(12) United States Patent
Abe

(10) Patent No.: US 6,928,998 B2
(45) Date of Patent: Aug. 16, 2005

(54) FUEL PROPERTIES ESTIMATION FOR INTERNAL COMBUSTION ENGINE

(75) Inventor: Kazuhiko Abe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/817,929

(22) Filed: Apr. 6, 2004

(65) Prior Publication Data

US 2004/0237951 A1 Dec. 2, 2004

(30) Foreign Application Priority Data

Apr. 7, 2003 (JP) ........................................ 2003-102419

(51) Int. Cl.[7] .......................... F02D 41/14; G01N 33/22; G06F 19/00
(52) U.S. Cl. .......................... 123/674; 73/116; 701/109; 123/1 A
(58) Field of Search ................................. 123/1 A, 435, 123/494, 672, 674, 679; 73/116, 117.3; 701/101–104, 109, 114, 115

(56) References Cited

U.S. PATENT DOCUMENTS

| | | | | |
|---|---|---|---|---|
| 5,582,157 A | * | 12/1996 | Uchikawa | 73/116 |
| 5,711,272 A | * | 1/1998 | Maegawa et al. | 73/116 |
| 5,850,824 A | | 12/1998 | Seitz et al. | |
| 6,073,611 A | * | 6/2000 | Ohuchi et al. | 123/1 A |
| 6,363,313 B1 | * | 3/2002 | Katoh et al. | 701/109 |
| 6,758,201 B2 | * | 7/2004 | Hosoi | 123/1 A |
| 2004/0162667 A1 | * | 8/2004 | Abe et al. | 701/109 |
| 2004/0182378 A1 | * | 9/2004 | Oshimi et al. | 123/1 A |

FOREIGN PATENT DOCUMENTS

| | | | | |
|---|---|---|---|---|
| JP | 5-163992 A | | 6/1993 | |
| JP | 9-42022 A | * | 2/1997 | 123/1 A |
| JP | 2000-180405 A | * | 6/2000 | 701/109 |
| JP | 2000-257467 A | * | 9/2000 | 123/435 |

OTHER PUBLICATIONS

U.S. Appl. No. 10/686,482, filed Oct. 16, 2003, Nagaishi et al.
U.S. Appl. No. 10/768,662, filed Feb. 2, 2004, Abe et al.

* cited by examiner

Primary Examiner—Willis R. Wolfe, Jr.
(74) Attorney, Agent, or Firm—Foley & Lardner LLP

(57) ABSTRACT

Fuel properties estimating apparatus for an internal combustion engine includes a controller to determine an estimated component concentration of a component such as alcohol in a fuel. The controller calculates a new value of the estimated component concentration in accordance with a component concentration variation and a stored previous value of the estimated component concentration. From an air-fuel ratio correction quantity calculated from an actual air fuel ratio, for correcting a fuel injection quantity, the controller calculates the component concentration variation by using a conversion function determined by the previous value of the component concentration.

9 Claims, 3 Drawing Sheets

FUEL PROPERTIES ESTIMATION FOR INTERNAL COMBUSTION ENGINE

BACKGROUND OF THE INVENTION

The present invention relates to an internal combustion engine, fuel properties estimating apparatus and process.

A vehicle known as flexible fuel vehicle (FFV) can run on a blend fuel of alcohol and gasoline as well as on gasoline. Alcohol fuel requires adjustment of a fuel injection quantity in accordance with an alcohol concentration in the fuel because the number of atoms of C (carbon) is different from that of ordinary gasoline fuel. Therefore, an engine system as shown in a Published Japanese Patent Application Publication No. H05(1993)-163992 is arranged to sense an alcohol concentration with an alcohol concentration sensor provided in a fuel tank and to estimate the alcohol concentration from an average value of air-fuel ratio feedback correction coefficient in the case of a failure of the alcohol concentration sensor.

SUMMARY OF THE INVENTION

It is an object of the present invention to provide fuel properties estimating apparatus and/or process, and/or engine control system/process for estimating properties of fuel more accurately and quickly.

According to one aspect of the present invention, a fuel properties estimating apparatus for an internal combustion engine, comprises: a controller to determine an estimated component concentration of a component in a fuel for the engine. The controller is configured to calculate an air-fuel ratio correction quantity for correcting a fuel supply quantity for the engine, in accordance with an actual air fuel ratio of the engine; to calculate a component concentration variation from a stored previous value of the estimated component concentration and the air-fuel ratio correction quantity; and to calculate a new value of the estimated component concentration in accordance with the component concentration variation and the stored previous value of the estimated component concentration. The controller determines the component concentration variation from the air-fuel ratio correction quantity by using a conversion function determined by the previous value of the component concentration.

According to another aspect of the invention, a fuel properties estimating process of determining an estimated component concentration of a component in a fuel for an internal combustion engine, comprises: calculating a new value of the estimated component concentration in accordance with a component concentration variation and a stored previous value of the estimated component concentration; and calculating the component concentration variation from the stored previous value of the estimated component concentration and an air-fuel ratio correction quantity calculated from an actual air fuel ratio of the engine, for correcting a fuel supply quantity for the engine. The component concentration variation is determined from the air-fuel ratio correction quantity by using a conversion function determined by the previous value of the component concentration.

DETAILED DESCRIPTION OF THE INVENTION

Figure 1:
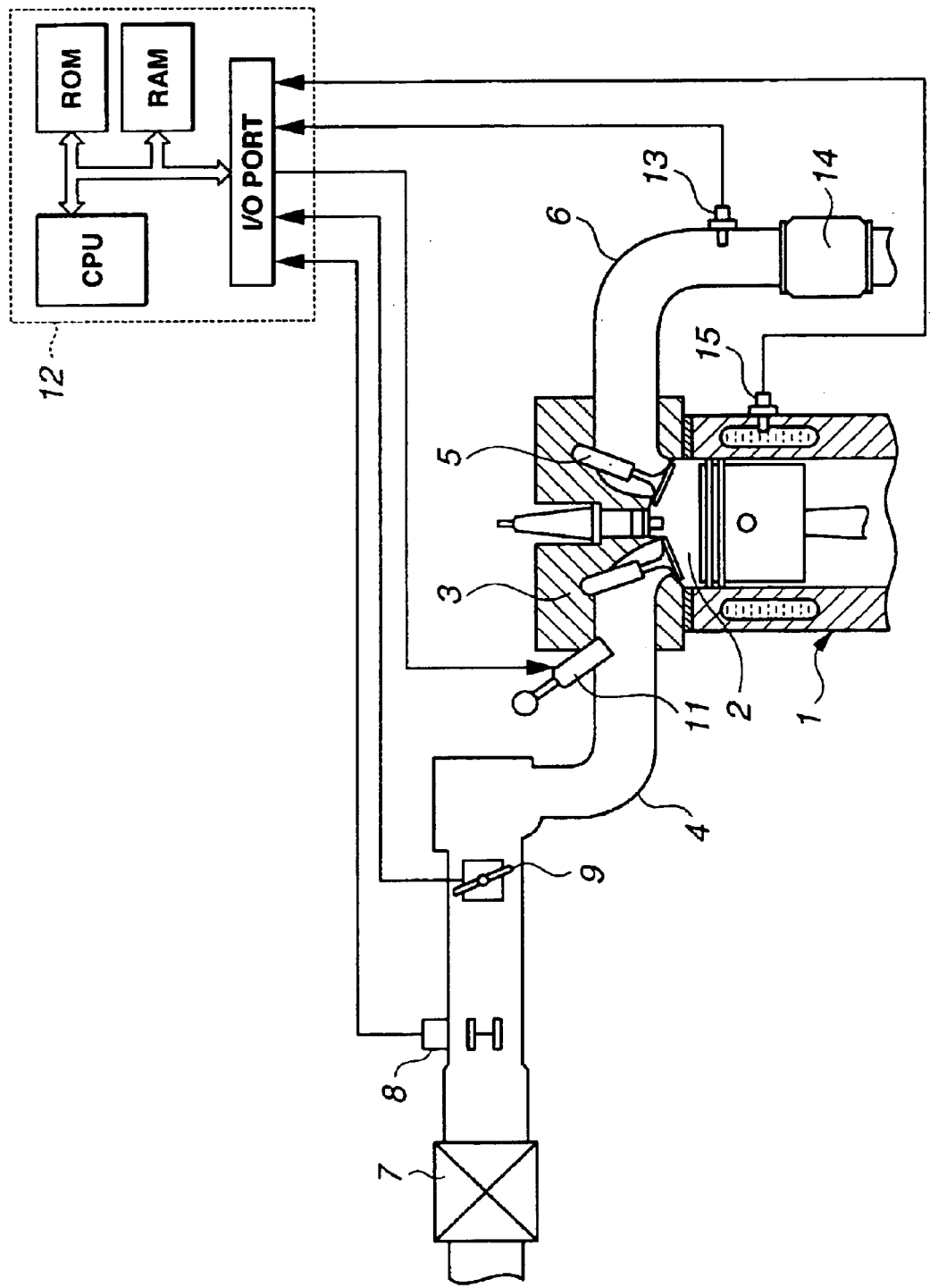
FIG. 1 is a schematic view showing an engine system serving as, or including part serving as, fuel properties estimating apparatus according to one embodiment of the present invention.

FIG. 1 shows an engine system, serving as or including part serving as fuel properties (composition) estimating apparatus, according to one embodiment of the present invention. An engine in this example is of a type capable of using a fuel containing alcohol.

An engine main block 1 includes at least one combustion chamber 2 with which an intake passage 4 is connected through an intake valve 3, and an exhaust passage 6 is connected through an exhaust valve 5.

In intake passage 4, there are provided an air cleaner 7, an air flowmeter 8 for sensing an intake air quantity, a throttle valve 9 for regulating the intake air quantity, and a fuel injector 11 for injecting fuel in the intake air.

An engine control unit (ECU) 12 produces a fuel injection command signal, and commands fuel injector 11 to inject fuel into the intake air to achieve a desired air-fuel ratio in accordance with engine operating conditions.

In exhaust passage 6, there are provided an oxygen sensor 13 for sensing an oxygen concentration in the exhaust gas mixture, and a three-way catalyst 14. Oxygen sensor 13 serves as air-fuel ratio sensing means for enabling calculation of an exhaust air-fuel ratio.

Three-way catalyst 14 can convert harmful emissions of hydrocarbons (HC), carbon monoxide (CO), and oxides of nitrogen (NOx) into less harmful gases with a maximum conversion efficiency in a window of the air-fuel ratio around the stoichiometry. Therefore, ECU 12 controls the air-fuel ratio of the engine in a feedback control mode based on the output of oxygen sensor 13 located on the upstream side of three-way catalyst 14 so that the actual air-fuel ratio swings within the air fuel ratio window.

A water temperature sensor 15 senses the temperature of an engine cooling water in engine main block 1. ECU 12 is connected with this sensor, and arranged to receive information from this sensor.

Fuel containing alcohol requires a large amount of fuel injection as compared to ordinary gasoline to obtain a given equivalence ratio because of the number of atoms of C (carbon), so that adjustment of the fuel injection quantity is required. Therefore, the engine system is arranged to predict the alcohol concentration of fuel accurately as quickly as possible, by utilizing the output signal of oxygen concentration sensor 13. In this embodiment, alcohol is a component in fuel, and the alcohol concentration is a component concentration estimated by the system.

Figure 2:
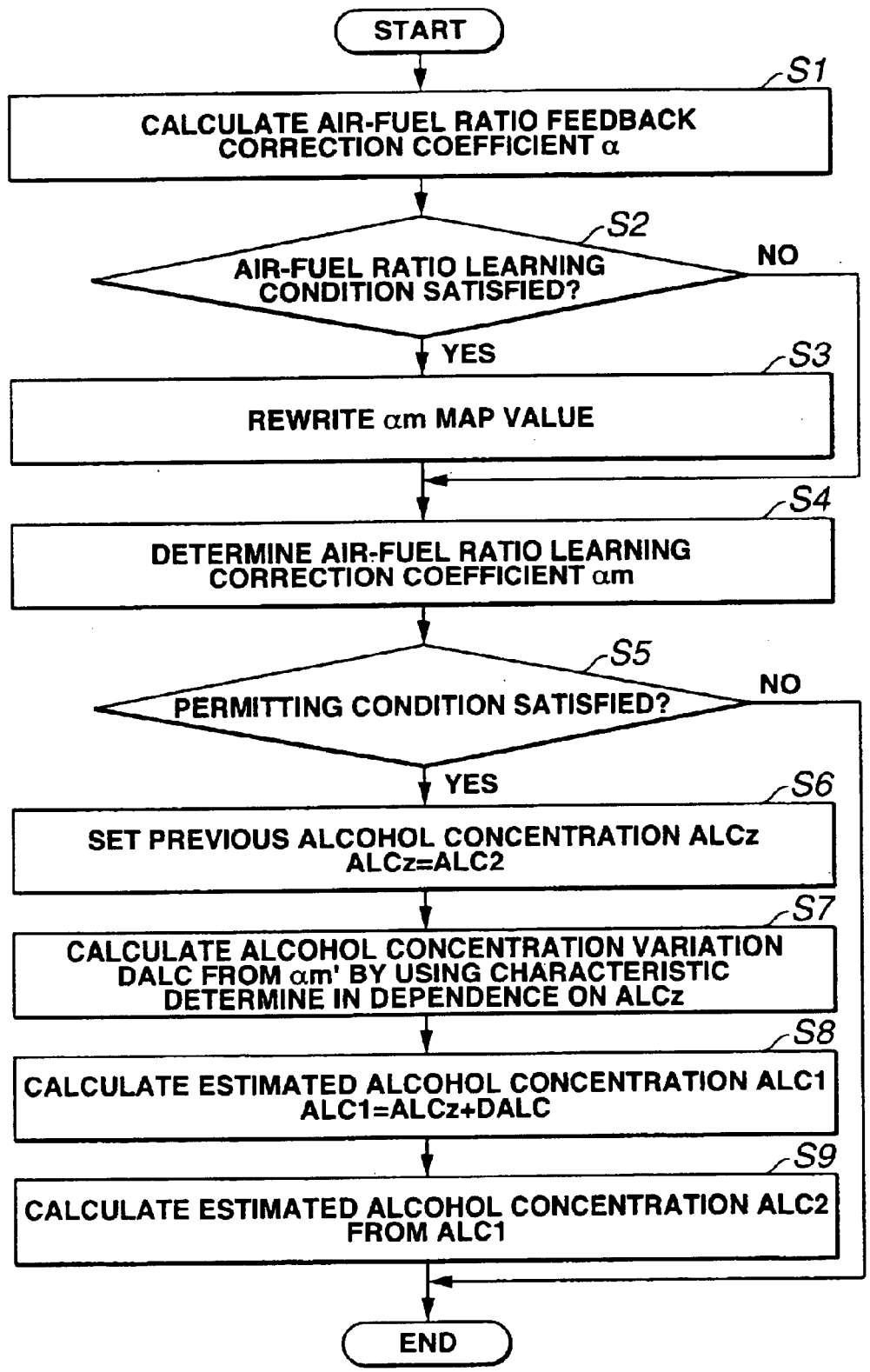
FIG. 2 is a flowchart showing a fuel properties estimating process according to the embodiment.

According to this embodiment, the engine system estimates the alcohol concentration in the fuel, as a single component concentration by following a process shown in FIG. 2.

Step S1 reads an air-fuel ratio feedback coefficient $\alpha$ (as an air-fuel ratio correction quantity) calculated from the output of oxygen concentration sensor 13.

Step S2 examines whether an air-fuel ratio learning condition is satisfied or not. When the learning condition is satisfied, the process proceeds to step S3, rewrites a map value in an αm calculation map for each operating region at S3, and then proceeds to step S4. When the learning condition is not satisfied, the process proceeds directly to S4 without performing the map rewriting operation of S3. In this example, αm is an air-fuel ratio learning correction coefficient (as the air-fuel ratio correction quantity). The air-fuel ratio feedback correction coefficient α and air-fuel ratio learning correction coefficient αm are parameters used for the feedback air-fuel ratio control. The fuel injection quantity is corrected in accordance with the air-fuel ratio feedback correction coefficient α and air-fuel ratio learning correction coefficient αm. This embodiment can employ various known methods for calculating the air-fuel ratio feedback correction coefficient α and air-fuel ratio learning correction coefficient αm.

Step S4 determines a value of αm in each operating region by lookup in the current αm map for each operating region.

Step S5 examines whether an estimation permitting condition is satisfied or not. In this example, step S5 checks the engine cooling water temperature, elapsed time from a start of the engine, progress of the air-fuel ratio learning control, and history of refueling to determine whether the estimation permitting condition is satisfied. When the estimation permitting condition is satisfied, the program proceeds from S5 to S6. If the estimation permitting condition is not satisfied, the program ends without performing the alcohol concentration estimation.

Step S6 sets a previous estimated alcohol concentration ALCz (a previous value of the estimated component concentration) equal to a second estimated alcohol concentration ALC2 currently being stored in ECU 12. That is, ALCz=ALC2.

Figure 3:
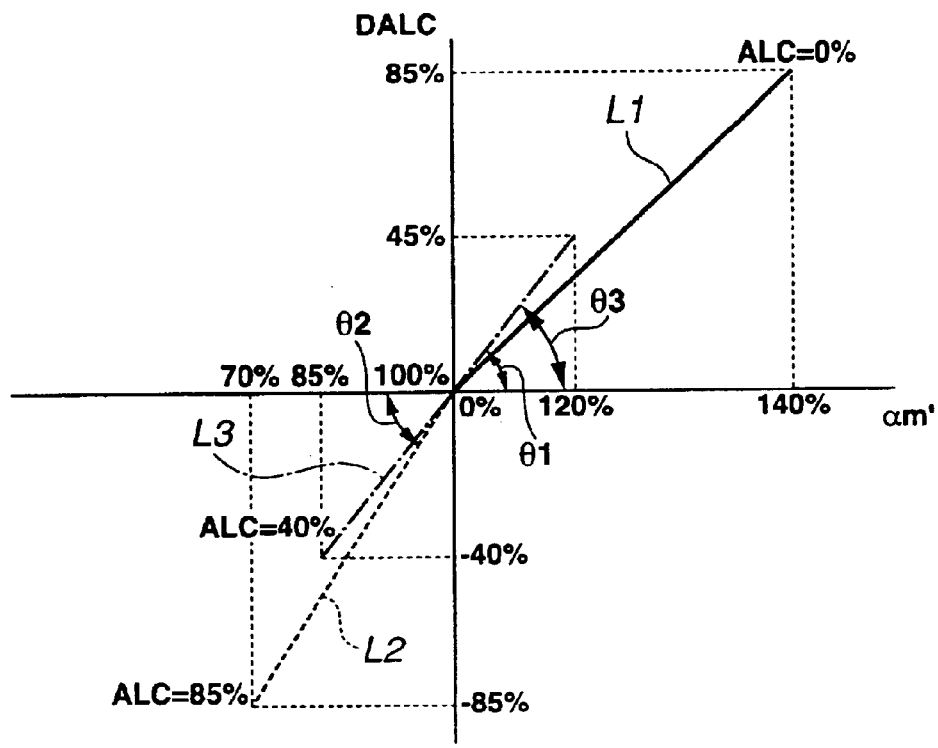
FIG. 3 is a graph showing a map used by the engine system of FIG. 1, for calculating an alcohol concentration variation DALC.

Step S7 calculates an alcohol concentration variation (or variation quantity) DALC, from an average αm' of αm values in representative speed load regions, by using one form of a conversion function as shown in FIG. 3 determined by the estimated alcohol concentration ALC calculated in S6. In this example, average αm' is determined from the αm values of four speed load regions. It is desirable to select, as the representative four regions, regions which are used relatively frequently by the engine.

In the example of FIG. 3, the characteristic of alcohol concentration variation DALC is continuous with respect to αm'. This characteristic is changed in accordance with the second estimated alcohol concentration ALC2 currently being stored in ECU 12. The characteristic is changed in accordance with ALC because the basic fuel injection quantity for the air-fuel ratio control includes a correction based on ALC. In the example of FIG. 3, a characteristic line L1 is a form of the conversion function for ALC=0% (the alcohol concentration of the fuel is 0%); a characteristic line L2 is a form of the conversion function for ALC=85% (the alcohol concentration of the fuel is 85%); and a characteristic line L3 is a form of the conversion function for ALC=40% (the alcohol concentration is 40%).

In this conversion function, the gradient increases as the alcohol concentration becomes higher. In the rectangular coordinates system having a vertical axis representing the alcohol concentration variation DALC, a horizontal axis representing αm', and an origin at (αm', DALC)=(1, 0), the gradient is increased as the alcohol concentration increases. In the example of FIG. 3, θ1<θ3<θ2 where θ1 is a gradient of characteristic line L1; θ2 is a gradient of characteristic line L2; and θ3 is a gradient of characteristic line L3.

Though FIG. 3 shows only three characteristic lines (three forms of the conversion function), this example employs a plurality of characteristic lines each for one of ALC values (ALC=0%, 5%, 10% . . . ) at intervals of 5%.

Step S8 calculates a new value of a first estimated alcohol concentration ALC1 by addition of the alcohol concentration variation DALC calculated at S7, and the previous estimated alcohol concentration ALCz which is currently stored as second estimated alcohol concentration ALC2 in ECU 12 (ALC1=ALCz+DALC).

Figure 4:
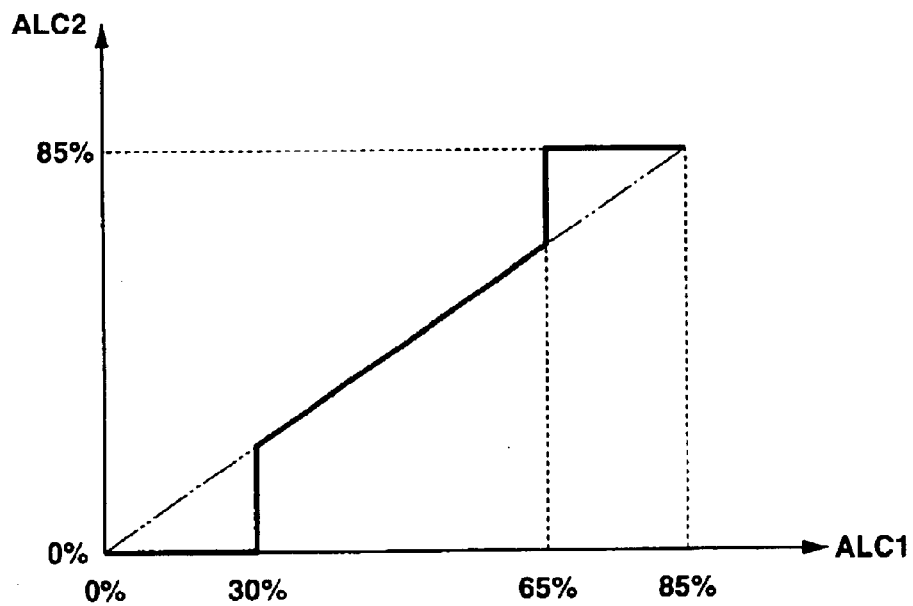
FIG. 4 is a graph showing a map used by the engine system of FIG. 1, for calculating an alcohol concentration ALC2.

Step S9 calculates a new value of the second estimated alcohol concentration ALC2 from the first estimated alcohol concentration ALC1 calculated at S8, by using an ALC2 calculation map shown in FIG. 4. The new value of second estimated alcohol concentration ALC2 calculated at S9 is stored as ALC2, in the memory section in ECU 12 until next calculation of ALC2 at S9.

This ALC2 calculation map of FIG. 4 is a characteristic for calculating ALC2 from ALC1, and this characteristic of ALC2 has at least one dead band with respect to ALC1. In other words, the ALC2 calculation map has the dead band in which second alcohol concentration ALC2 is substantially constant regardless of changes in ALC1. The dead band is provided in a predetermined region of the first estimated alcohol concentration ALC1. In the example shown in FIG. 4, the second estimated alcohol concentration ALC2 is invariably equal to 0% in a region of first estimated alcohol concentration ALC1 from 0% to 30%, and ALC2 is invariably equal to 85% in a region of first estimated alcohol concentration ALC1 from 65% to 85%.

This characteristic of FIG. 4 is set to provide stable control values (control constants) when gasoline (E0 fuel having ethanol concentration of 0%) is used or when standardized blend fuel (gasoline-alcohol blend fuel) such as E85 fuel having ethanol concentration of 85% is used. The above-mentioned control values (control constants) includes at least one of control constant about the ignition timing, constant about correction of wall flow of fuel, constant about cold enrichment, and constant about ternary point adjustment of lambda control or a target air-fuel ratio in the air-fuel ratio control. When these quantities are varied, the repeatability of emission control becomes worse. The problem can be solved by the setting of the dead band.

The ALC2 calculation map of this example includes a dead band at or near the ethanol concentration of E0 fuel, and a dead band at or near the ethanol concentration of E85, both available on the market. Therefore, the result (ALC2) of estimation corresponds stably to the alcohol concentration of a commercially available fuel.

The new value of estimated alcohol concentration ALC2 calculated at S9 is stored (for use as the previous alcohol concentration ALCz) in place of the most recent value in a memory section in ECU 12 until the next calculation of ALC2 at S9. The initial value of ALCz is set equal to 0 (ALCz=0%).

Steps S1~S4 of FIG. 2 correspond to an air-fuel ratio correction quantity calculating means; S7 corresponds to a component concentration variation calculating means; and S8 and S9 correspond to a component concentration calculating means. The maps shown in FIGS. 3 and 4 are stored in a ROM in ECU 12.

By calculating the alcohol concentration variation DALC in accordance with the previous estimated alcohol concentration ALCz and the average air-fuel ratio learning coefficient αm', the fuel properties estimating apparatus according to the embodiment can reduce the deviation between the actual alcohol concentration and the estimated alcohol concentration quickly, and thereby correct the combustion control with the accurately estimated second alcohol concentration ALC2, to minimize the deterioration of exhaust performance and driving performance. In particular, by selecting the best form of the conversion function for determining the variation quantity DALC in dependence on the previous estimated alcohol concentration ALCz, the alcohol concentration estimating apparatus can determine second estimated alcohol concentration ALC2 accurately with the optimum form of the conversion function.

The time required for the estimation of the alcohol concentration is short. Therefore, the estimating apparatus according to the embodiment can reduce the downtime of a system which is to be stopped under the requirement of the accuracy, and thereby minimize the associated impairment.

By using the air-fuel ratio learning coefficient $\alpha m$ for determination of alcohol concentration variation DALC, the estimating system of the embodiment can reduce errors which might be caused when fuel of a certain alcohol concentration is used invariably for a long time.

In the illustrated example, the conversion function is stored in the form of a map of characteristic lines as shown in FIG. 3. Instead, it is possible to determine the alcohol concentration variation DALC by interpolation. In the rectangular coordinates system with the vertical axis representing the alcohol concentration variation DALC, the horizontal axis representing $\alpha m'$, and the origin at $\{\alpha m', DALC\}=\{1, 0\}$, the estimating system can determine an intermediate value of the dependent variable (that is DALC) which is a function of the independent variable ($\alpha m'$) by linear interpolation when values of the dependent variable corresponding to at least two discrete values of the independent variable are known. In the case of characteristic line L1, for example, ECU 12 holds only the data on two ends of characteristic line L1 $\{\alpha m', DALC\}=\{1.4, 85\}$ and $\{\alpha m', DALC\}=\{1.0, 0\}$; and determines a value of DALC in the range of $1.0<\alpha m'<1.4$ by linear interpolation.

Furthermore, it is possible to determine a form of the conversion function for the range of $0\%<ALC<85\%$, such as characteristic line L3, by interpolation from characteristic lines L1 and L2.

In this way, the estimating system can reduce the amount of information to be stored in ECU 12 by the interpolation, and reduce the required capacity of ROM in ECU 12.

In the illustrated example, the alcohol concentration variation DALC is determined from the average air-fuel ratio learning coefficient $\alpha m'$. Instead of $\alpha m'$, it is possible to employ the air-fuel ratio feedback correction coefficient $\alpha$. In this case, the estimating system can capture the concentration properly even in the transient state due to motion of fuel after supply of the fuel into a fuel tank, and transportation delay of fuel in fuel supply piping.

The thus-constructed fuel properties estimating apparatus according to the embodiment of the present invention includes at least: means for calculating the component concentration variation (quantity) from the air-fuel ratio correction quantity by using the conversion function determined by the previous (most recent) value of the component concentration; and means for calculating a new value of the estimated component concentration in accordance with the component concentration variation and the stored previous (most recent) value of the estimated component concentration. Therefore, the estimating apparatus can estimate the component concentration accurately by using the accurately determined variation (quantity). If the component concentration such as alcohol concentration is estimated by using a relation between the average of the air-fuel ratio feedback correction coefficient and the component concentration as in the before-mentioned Published Japanese Patent Application Publication No. H05(1993)-163992, the characteristic between the component concentration of the fuel and the air-fuel ratio feedback correction coefficient must be changed.

Step S7 in one example includes a first operation (first sub-step) of determining the form of the conversion function by the previous (most recent) value of the component concentration; and a second operation (second sub-step) of calculating the component concentration variation (quantity) from the air-fuel ratio correction quantity by using the form of the conversion function determined in the first operation (sub-step) by the previous (most recent) value of the component concentration. The first operation corresponds to means for determining a form of the conversion function used for calculating the component concentration variation from the air-fuel ratio correction quantity, in accordance with the previous value of the component concentration.

The thus-constructed fuel properties estimating system determines a new value of the estimated component concentration of a component such as alcohol in fuel, by using the component concentration variation based on a previous value of the estimated component concentration ALC, and the air-fuel ratio correction quantity. Therefore, the estimating system can reduce an error of the estimated component concentration from the actual concentration rapidly, and achieve accurate estimation of a component concentration for accurate combustion control to minimize deterioration of exhaust performance and drivability. The quick estimation of component concentration according to this embodiment makes it possible to produce a quick responsive control action such as an action to stop operation to minimize engine performance deterioration.

The air-fuel ratio correction quantity can include the air-fuel ratio feedback correction coefficient $\alpha$. Therefore, the estimating system can detect concentration changes and transient state due to fuel stirring after fueling, and fuel transportation delay in fuel piping.

Moreover, the air-fuel ratio correction quantity can include the air-fuel ratio learning correction coefficient $\alpha m$. Therefore, the estimating system can reduce errors when fuel of the same alcohol concentration is used for a long period of time.

This application is based on a prior Japanese Patent Application No. 2003-102419 filed on Apr. 7, 2003. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A fuel properties estimating apparatus for an internal combustion engine, the fuel properties estimating apparatus comprising:

a controller to determine an estimated component concentration of a component in a fuel for the engine, the controller being configured, to calculate an air-fuel ratio correction quantity for correcting a fuel supply quantity for the engine, in accordance with an actual air fuel ratio of the engine;

to calculate a component concentration variation from a stored previous value of the estimated component concentration and the air-fuel ratio correction quantity; and to calculate a new value of the estimated component concentration in accordance with the component concentration variation and the stored previous value of the estimated component concentration;

the controller being configured to determine the component concentration variation from the air-fuel ratio correction quantity by using a conversion function determined by the previous value of the component concentration.

2. The fuel properties estimating apparatus as claimed in claim 1, wherein the conversion function is a relation between the air-fuel correction quantity as an independent variable, and the component concentration variable as a dependent variable, and the controller is configured to determine a form of the conversion function in accordance with the previous value of the component concentration, and to determine the component concentration variation from the air-fuel ratio correction quantity by using the form of the conversion function determined by the previous value of the component concentration.

3. The fuel properties estimating apparatus as claimed in claim 2, wherein the controller is configured to determine a value of the dependent variable by interpolation from two sets of values of the independent and dependent variables.

4. The fuel properties estimating apparatus as claimed in claim 1, wherein the air-fuel correction quantity comprises an air-fuel ratio feedback correction coefficient calculated in accordance with the actual air fuel ratio sensed by an air-fuel ratio sensor.

5. The fuel properties estimating apparatus as claimed in claim 1, wherein the air-fuel correction quantity comprises an air-fuel ratio learning correction quantity calculated from an air-fuel ratio feedback correction coefficient which determined from the actual air-fuel ratio sensed by an air-fuel ratio sensor.

6. The fuel properties estimating apparatus as claimed in claim 1, wherein the component in the fuel for the engine is alcohol, and the estimated component concentration is an alcohol concentration.

7. The fuel properties estimating apparatus as claimed in claim 1, wherein the controller is configured to increase the component concentration variation with increase in the air-fuel ratio correction quantity, and to increase the rate of increase of the component concentration variation with respect to the air-fuel ratio correction quantity, as the previous value of the estimated component concentration increases.

8. A fuel properties estimating process of determining an estimated component concentration of a component in a fuel for an internal combustion engine, the fuel properties estimating process comprising:

calculating a new value of the estimated component concentration in accordance with a component concentration variation and a stored previous value of the estimated component concentration; and calculating the component concentration variation from the stored previous value of the estimated component concentration and an air-fuel ratio correction quantity calculated from an actual air fuel ratio of the engine, for correcting a fuel supply quantity for the engine;

the component concentration variation being determined from the air-fuel ratio correction quantity by using a conversion function determined by the previous value of the component concentration.

9. A fuel properties estimating apparatus for determining an estimated component concentration of a component in a fuel for an internal combustion engine, the fuel properties estimating apparatus comprising:

means for calculating an air-fuel ratio correction quantity for correcting a fuel supply quantity for the engine, in accordance with an actual air fuel ratio of the engine;

means for calculating a component concentration variation from a stored previous value of the estimated component concentration and the air-fuel ratio correction quantity;

means for calculating a new value of the estimated component concentration in accordance with the component concentration variation and the stored previous value of the estimated component concentration;

means for determining a form of a conversion function used for calculating the component concentration variation from the air-fuel ratio correction quantity, in accordance with the previous value of the component concentration.

* * * * *